E. Spaulding,
Friction Clutch.

Nº 24,156. Patented May 24, 1859.

UNITED STATES PATENT OFFICE.

EDWARD SPAULDING, OF WESTBORO, MASSACHUSETTS.

FRICTION-PULLEY.

Specification of Letters Patent No. 24,156, dated May 24, 1859.

*To all whom it may concern:*

Be it known that I, EDWARD SPAULDING, of Westboro, in the county of Worcester and State of Massachusetts, have invented a new and useful Improvement in Applying and Supporting Friction-Pulleys; and I do hereby declare that the same is fully described and represented in the following specification and the acompanying drawings, of which—

Figure 1:
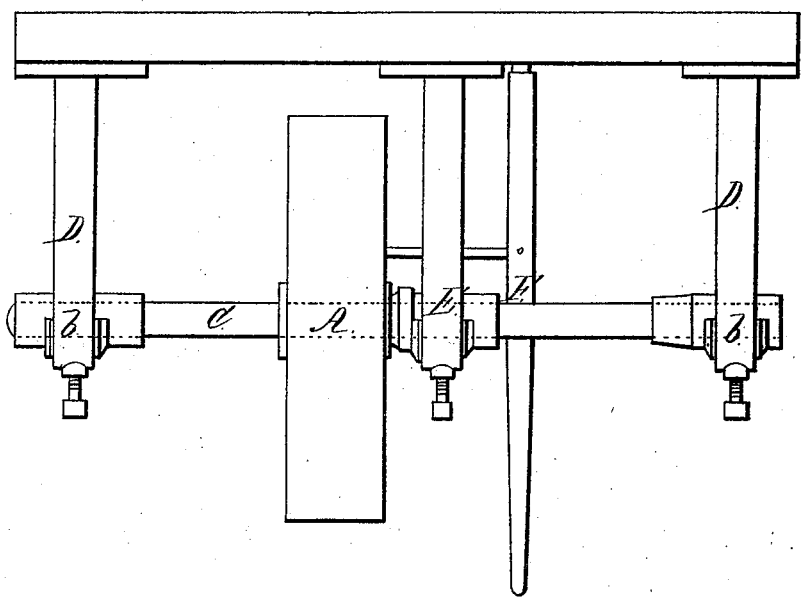
Figure 2:
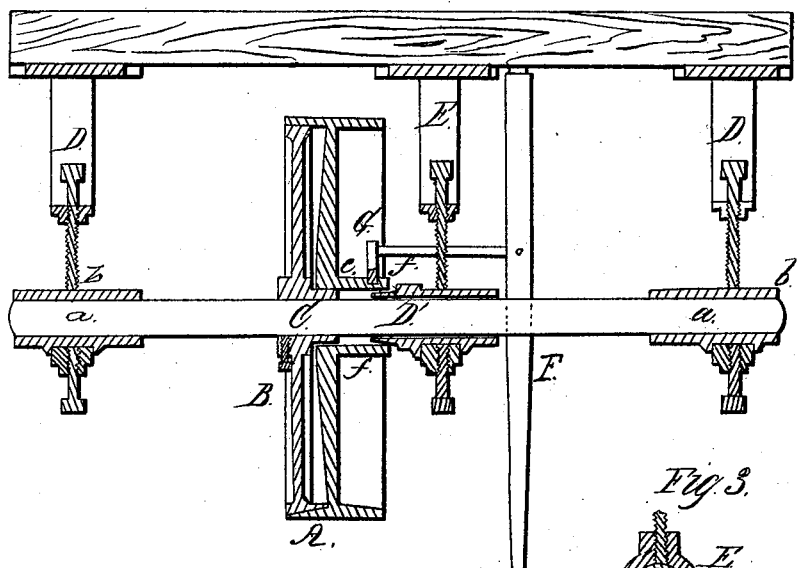
Figure 3:

Figure 1, is a front elevation, and Fig. 2, a longitudinal section of two friction pulleys and their supporting devices. Fig. 3, is a transverse section taken through the middle hanger to be hereinafter mentioned.

The nature of my invention consists in the combination of a tubular rest with the driving pulley, one of the hangers and the shaft of the driving pulley, when such pulleys are applied and made to operate together in manner as hereinafter described.

In the drawings, A, and B, are two friction pulleys, one of which, viz. B, plays within the other and is fixed to a shaft C, whose journals $a$, $a$, run in bearings $b$, $b$, sustained by two hangers D, D, which may be supposed to depend from the ceiling of an apartment.

The periphery of the inner pulley, B, is made conical or tapering as shown in Fig. 2. So with regard to that part of the inner periphery of the pulley A, which immediately surrounds the pulley such is made conical and so as to fit closely the periphery of the pulley, B, when the pulley, B, is forced within the pulley A, the conical surfaces by their contact serving to produce friction sufficient to cause the pulley A, to be revolved by the pulley B, while the latter is in rotation.

While the pulley B, is stationary relatively to the shaft C, the pulley A, is not fixed to such shaft or in any manner supported by it, but has extending out of its hub, $c$, a tubular tapering rest D', supported by a hanger E, and applied thereto as shown in the drawings. This rest receives the movable pulley A, and supports it while being moved away from the pulley B, and out of engagement with it, such pulley, A, being furnished with a shifting lever, F, carrying a sliding fork, G, which extends into a groove $f$, made around the hub of the wheel A. By means of such last described devices, the pulley A, may be moved either toward or away from the pulley A. Now, if while the shaft C, is in rotation, an endless band be extended around the periphery of the pulley A, and some other pulley of some machine or shaft to which it may be desirable to impart motion, we have the means either of setting the pulley, A, in motion or arresting the motion without the necessity of slipping the band from another or driving pulley to and upon the said pulley, A, and vice versa. The common plan of arranging what are termed "fast and loose pulleys" is to place them side by side with their peripheries equal in diameter, one pulley being fastened to and the other loose on the shaft. In this latter case, the shaft constantly revolves more or less within the loose pulley and with considerable friction, and the belt has to be moved from one pulley to the other in order to put the shaft in revolution.

In my arrangement of the pulleys as shown in the drawings, the belt is always on one and the same pulley and never moved from one to the other. And, furthermore, when the pulley A, is out of engagement with the pulley B, such pulley, A, will not be sustained by the shaft, C, but will be supported by and on the tubular rest through which the shaft is to run without any contact to produce friction, the internal diameter of the said rest being greater than the diameter of the shaft. By making with a taper that part of the tubular rest on which the pulley A is applied, the said pulley when moved up into engagement with the pulley B, will be moved entirely out of contact with the said rest and therefore will not run on it with any friction. The only friction which can ever be generated on the tubular rest will arise from the rotary motion of the pulley, A, (due to its momentum immediately after such pulley may have been moved back out of engagement with the pulley, B). The amount of such rotary motion will be very slight, comparatively speaking. The great advantage of the tubular tapering rest for supporting the pulley independently of the shaft, C, will thus be seen.

I therefore claim—

The combination of the tubular rest, D', with the driving pulley A, the hanger E, or its equivalent and the shaft, C, of the driving pulley, B, the pulleys being arranged and made to operate with respect to one another essentially as specified.

In testimony whereof, I have hereunto set my signature.

EDWD. SPAULDING.

Witneses:
 BENJAMIN BOYNTON,
 S. G. HENRY.